(12) United States Patent
He et al.

(10) Patent No.: US 11,307,727 B2
(45) Date of Patent: Apr. 19, 2022

(54) TOUCH CONTROL DISPLAY PANEL, TOUCH CONTROL DISPLAY APPARATUS, TOUCH SUBSTRATE, AND METHOD OF FABRICATING TOUCH CONTROL DISPLAY PANEL

(71) Applicants: Chengdu BOE Optoelectronics Technology Co., Ltd., Sichuan (CN); BOE Technology Group Co., Ltd., Beijing (CN)

(72) Inventors: Yuedi He, Beijing (CN); Guoqiang Tang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 19 days.

(21) Appl. No.: 16/755,659

(22) PCT Filed: Nov. 18, 2019

(86) PCT No.: PCT/CN2019/119169
§ 371 (c)(1),
(2) Date: Apr. 13, 2020

(87) PCT Pub. No.: WO2020/103787
PCT Pub. Date: May 28, 2020

(65) Prior Publication Data
US 2021/0223890 A1 Jul. 22, 2021

(30) Foreign Application Priority Data

Nov. 23, 2018 (CN) .......................... 201811406662.3

(51) Int. Cl.
*G06F 3/045* (2006.01)
*G06F 3/041* (2006.01)

(52) U.S. Cl.
CPC ............ *G06F 3/045* (2013.01); *G06F 3/0412* (2013.01)

(58) Field of Classification Search
None
See application file for complete search history.

(56) References Cited

U.S. PATENT DOCUMENTS

2010/0300862 A1* 12/2010 Tamura ................ H03K 17/962
200/600
2015/0177884 A1 6/2015 Han
(Continued)

FOREIGN PATENT DOCUMENTS

CN 105824475 A 8/2016
CN 106020557 A 10/2016
(Continued)

OTHER PUBLICATIONS

International Search Report & Written Opinion dated Feb. 3, 2020, regarding PCT/CN2019/119169.
(Continued)

*Primary Examiner* — Stephen T. Reed
(74) *Attorney, Agent, or Firm* — Intellectual Valley Law, P.C.

(57) ABSTRACT

A touch control display panel is provided. The touch control display panel includes a base substrate; and a black matrix layer on the base substrate and in an inter-subpixel region of the touch control display panel. The black matrix layer includes a non-sensing portion, and a plurality of sensing portions spaced apart from the non-sensing portion. The touch control display panel further includes a first electrode layer including a plurality of first electrode blocks respectively between the plurality of sensing portions and the base substrate; and a second electrode layer including a plurality of second electrode blocks respectively on a side of the plurality of sensing portions away from the first electrode
(Continued)

layer. A respective one of the plurality of sensing portions is configured to undergo a restorable change in electrical resistivity in response to a pressure from a touch.

20 Claims, 8 Drawing Sheets

(56) References Cited

U.S. PATENT DOCUMENTS

| | | | |
|---|---|---|---|
| 2016/0034072 A1 | 2/2016 | Yang et al. | |
| 2016/0320882 A1* | 11/2016 | Kim | G09G 3/20 |
| 2017/0010745 A1* | 1/2017 | Liu | G06F 3/0412 |
| 2017/0082882 A1 | 3/2017 | Hirakata et al. | |
| 2018/0046298 A1 | 2/2018 | Weng et al. | |
| 2018/0067589 A1 | 3/2018 | Leng | |
| 2018/0166507 A1* | 6/2018 | Hwang | G06F 3/041 |
| 2018/0299983 A1 | 10/2018 | Liu et al. | |
| 2018/0300006 A1 | 10/2018 | Lim et al. | |
| 2018/0321773 A1 | 11/2018 | Yang et al. | |
| 2019/0324569 A1 | 10/2019 | Ma et al. | |

FOREIGN PATENT DOCUMENTS

| | | |
|---|---|---|
| CN | 106030471 A | 10/2016 |
| CN | 107203299 A | 9/2017 |
| CN | 107290084 A | 10/2017 |
| CN | 107340915 A | 11/2017 |
| CN | 107728357 A | 2/2018 |
| CN | 108469321 A | 8/2018 |
| CN | 108563361 A | 9/2018 |
| CN | 108663154 A | 10/2018 |
| CN | 108733252 A | 11/2018 |

OTHER PUBLICATIONS

First Office Action in the Chinese Patent Application No. 201811406662.3 dated Dec. 27, 2019; English translation attached.
Second Office Action in the Chinese Patent Application No. 201811406662.3 dated May 14, 2020; English translation attached.
Decision of Rejection in the Chinese Patent Application No. 201811406662.3 dated Aug. 20, 2020; English translation attached.

* cited by examiner

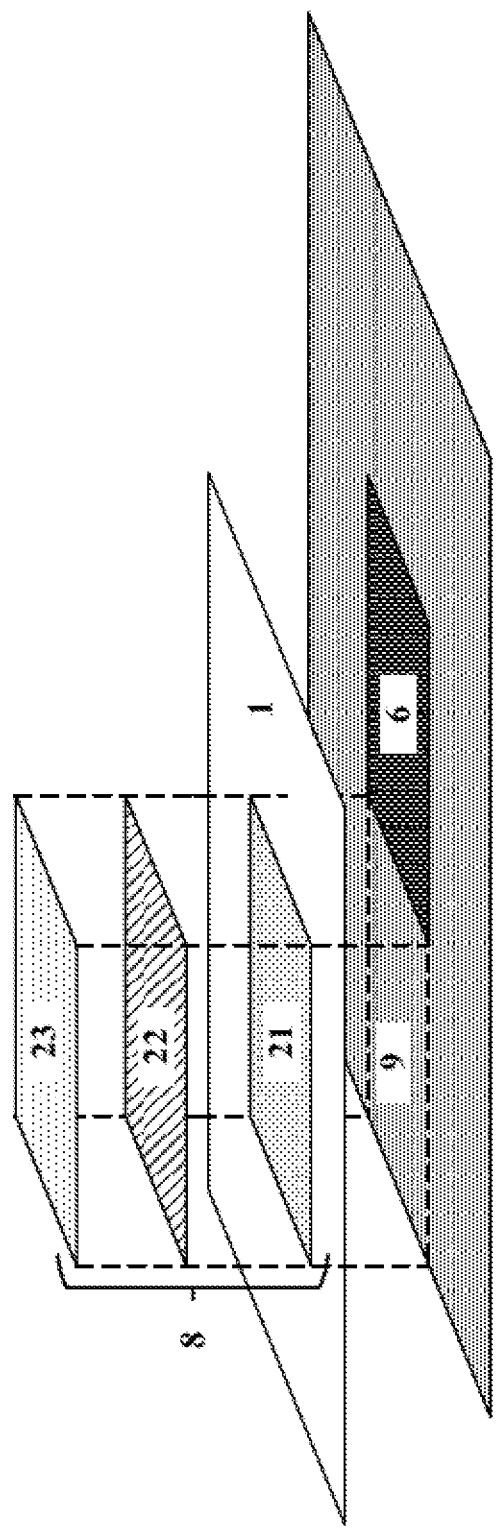

TOUCH CONTROL DISPLAY PANEL, TOUCH CONTROL DISPLAY APPARATUS, TOUCH SUBSTRATE, AND METHOD OF FABRICATING TOUCH CONTROL DISPLAY PANEL

CROSS-REFERENCE TO RELATED APPLICATION

This application is a national stage application under 35 U.S.C. § 371 of International Application No. PCT/CN2019/119169, filed Nov. 18, 2019, which claims priority to Chinese Patent Application No. 201811406662.3, filed Nov. 23, 2018. Each of the forgoing applications is herein incorporated by reference in its entirety for all purposes.

TECHNICAL FIELD

The present invention relates to display technology, more particularly, to a touch control display panel a touch control display apparatus, a touch control display apparatus, a touch substrate, and a method of fabricating a touch control display panel.

BACKGROUND

Conventional touch devices can be generally categorized into resistive, capacitive, optical sound wave, and electromagnetic designs. In recent years, touch devices have been widely used in many electronic devices such as mobile phones, computer display panels, touch screens, satellite navigation devices, digital cameras, etc. In conventional capacitive touch devices, the point on the display panel touched by a finger is detected by detecting the change in the capacitance of the capacitor coupled with the linger through a touch sensing electrode. The conventional touch devices can only detect a two-dimensional location of a touch event, and are unable to detect a third dimension of the touch event, i.e. a pressure applied by the touch.

SUMMARY

In one aspect, the present invention provides a touch control display panel, comprising a base substrate; and a black matrix layer on the base substrate and in an inter-subpixel region of the touch control display panel; wherein the black matrix layer comprises a non-sensing portion, and a plurality of sensing portions spaced apart from the non-sensing portion; wherein the touch control display panel further comprises a first electrode layer comprising a plurality of first electrode blocks respectively between the plurality of sensing portions and the base substrate; and a second electrode layer comprising a plurality of second electrode blocks respectively on a side of the plurality of sensing portions away front the first electrode layer, wherein a respective one of the plurality of sensing portions is configured to undergo a restorable change in electrical resistivity in response to a pressure from a touch.

Optionally, the plurality of first electrode blocks are respectively in direct contact with the plurality of sensing portions; the plurality of second electrode blocks are respectively in direct contact with the plurality of sensing portions; and a respective one of the plurality of first electrode blocks, the respective one of the plurality of sensing portions, and a respective one of the plurality of second electrode blocks form a touch unit configured to detect a change in electrical resistivity in the respective one of the plurality of sawing portions in response to the pressure from the touch.

Optionally, an orthographic projection of the respective one of the plurality of first electrode blocks on the base substrate at least partially overlaps with an orthographic projection of the respective one of the plurality of sensing portions on the base substrate; and an orthographic projection of the respective one of the plurality of second electrode blocks on the base substrate at least partially overlaps with the orthographic projection of the respective one of the plurality of sensing portions on the base substrate.

Optionally, a thickness of the non-sensing portion is greater than a thickness of each of the plurality of sensing portions.

Optionally, a combined thickness of the respective one of the plurality of first electrode blocks, the respective one of the plurality of sensing portions, and the respective one of the plurality of second electrode blocks in the touch unit is substantially the same as a thickness of the non-sensing portion.

Optionally, a thickness of the respective one of the plurality of first electrode blocks is in a range of 3000 Å to 5000 Å; a thickness of the respective one of the plurality of sensing portions is in a range of 2 μm to 3 μm; and a thickness of the respective one of the plurality of second electrode blocks is in a range of 3000 Å to 5000 Å.

Optionally, the non-sensing portion and the plurality of sensing portions comprise a same conductive black material; and the non-sensing portion and the plurality of sensing portions together form the black matrix layer extending substantially throughout an entirety of the inter-subpixel region.

Optionally, the touch control display panel further comprises a plurality of first signal lines respectively electrically connected to the plurality of first electrode blocks, and configured to apply a common voltage to the plurality of first electrode blocks; and a plurality of second signal lines respectively electrically connected to the plurality of second electrode blocks, and configured to transmit sensing signals from the plurality of second electrode blocks to an integrated circuit.

Optionally, the plurality of sensing portions are arranged in a form of array in the touch control display panel.

Optionally, the second electrode layer comprises a substantially transparent conductive material or a non-reflective material.

Optionally, the non-sensing portion and the plurality of sensing portions together define a plurality of subpixel regions; the touch control display panel further comprises a plurality of color filter blocks respectively in the plurality of subpixel regions; and an array substrate comprising a plurality of light emitting elements respectively in the plurality of subpixel regions.

Optionally, the conductive black material comprises a black conductive particle dispersed in a polymer matrix.

In another aspect, the present invention provides a touch control display apparatus, comprising the touch control display panel described herein, and one or more integrated circuits connected to the touch control display panel.

In another aspect, the present invention provides a touch substrate, comprising a base substrate; and a black matrix layer on the base substrate and in an inter-subpixel region of the touch substrate; wherein the black matrix layer comprises a non-sensing portion, and a plurality of sensing portions spaced apart from the non-sensing portion; wherein the touch substrate further comprises a first electrode layer comprising a plurality of first electrode blocks respectively between the plurality of sensing portions and the base substrate; and a second electrode layer comprising a plurality of second electrode blocks respectively on a side of the plurality of sensing portions away from the first electrode layer; wherein a respective one of the plurality of sensing portions is configured to undergo a restorable change in electrical resistivity in response to a pressure from a touch.

Optionally, the plurality of first electrode blocks are respectively in direct contact with the plurality of sensing portions; the plurality of second electrode Modes are respectively in direct contact with the plurality of sensing portions; and a respective one of the plurality of first electrode blocks, the respective one of the plurality of sensing portions, and a respective one of the plurality of second electrode blocks form a touch unit configured to detect a change in electrical resistivity in the respective one of the plurality of sensing portions in response to the pressure from the touch.

Optionally, an orthographic projection of the respective one of the plurality of first electrode blocks on the base substrate at least partially overlaps with an orthographic projection of the respective one of the plurality of sensing portions on the base substrate; and an orthographic projection of the respective one of the plurality of second electrode Modes on the base substrate at least partially overlaps with the orthographic projection of the respective one of the plurality of sensing portions on the base substrate.

Optionally, a thickness of the non-sensing portion is greater than a thickness of each of the plurality of sensing portions.

Optionally, a combined thickness of the respective one of the plurality of first electrode blocks, the respective one of the plurality of sensing portions, and the respective one of the plurality of second electrode blocks in the touch unit is substantially the same as a thickness of the non-sensing portion.

Optionally, a thickness of the respective one of the plurality of first electrode blocks is in a range of 3000 Å to 3000 Å; a thickness of the respective one of the plurality of sensing portions is in a range of 2 μm to 3 μm; and a thickness of the respective one of the plurality of second electrode blocks is in a range of 3000 Å to 5000 Å.

Optionally, the non-sensing portion and the plurality of sensing portions comprise a same conductive black material; and the non-sensing portion and the plurality of sensing portions together form the black matrix layer extending substantially throughout an entirety of the inter-subpixel region.

Optionally, the touch substrate further comprises a plurality of first signal lines respectively electrically connected to the plurality of first electrode blocks, and configured to apply a common voltage to the plurality of first electrode blocks; and a plurality of second signal lines respectively electrically connected to the plurality of second electrode blocks, and configured to transmit sensing signals from the plurality of second electrode blocks to an integrated circuit.

Optionally, the plurality of sensing portions are arranged in a form of array in the touch substrate.

Optionally, the second electrode layer comprises a substantially transparent conductive material.

In another aspect, the present invention provides a method of fabricating a touch control display panel comprising providing a base substrate; and forming a black matrix layer on abase substrate and in an inter-subpixel region of the touch control display panel; wherein forming the black matrix layer comprises forming a non-sensing portion, and forming a plurality of sensing portions spaced apart from the non-sensing portion; wherein the method further comprises forming a first electrode layer comprising a plurality of first electrode blocks respectively between the plurality of sensing portions and the base substrate; and forming a second electrode layer comprising a plurality of second electrode blocks respectively on a side of the plurality of sensing portions away from the first electrode layer, wherein a respective one of the plurality of sensing portions is formed to undergo a restorable change in electrical resistivity in response to a pressure from a touch.

Optionally, the plurality of first electrode blocks are formed to be respectively in direct contact with the plurality of sensing portions; the plurality of second electrode blocks are formed to be respectively in direct contact with the plurality of sensing portions; and a respective one of the plurality of first electrode blocks, the respective one of the plurality of sensing portions, and a respective one of the plurality of second electrode blocks form a touch unit to detect a change in electrical resistivity in the respective one of the plurality of sensing portions in response to the pressure from the touch.

Optionally, the method further comprises forming a plurality of first signal lines respectively electrically connected to the plurality of first electrode blocks, and configured to apply a common voltage to the plurality of first electrode blocks; and forming a plurality of second signal lines respectively electrically connected to the plurality of second electrode blocks, and configured to transmit sensing signals from the plurality of second electrode blocks to an integrated circuit.

BRIEF DESCRIPTION OF THE FIGURES

The Following drawings are merely examples for illustrative purposes according to various disclosed embodiments and are not intended to limit the scope of the present invention.

FIG. 12 is a schematic diagram of a respective one of a plurality of touch units and a pixel definition layer in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In present, a touch control display panel usually includes a polarizer to prevent the ambient light from being reflected by the elements (e.g., metallic signal lines) in the touch control display panel and the light reflected will have an adverse effect on the touch control display panel. Moreover, the cost of a polarizer is high, and the polarizer may block, more than 50% of light emitted by the light emitting elements in the touch control display panel.

Accordingly, the present disclosure provides, inter alia, touch control display panel, a touch substrate, and a method of fabricating a touch control display panel that substantially obviate one or more of the problems due to limitations and disadvantages of the related art. In one aspect, the present disclosure provides a touch control display panel. In some embodiments, the touch control display panel includes a base substrate, and a black matrix layer on the base substrate and in an inter-subpixel region of the touch control display panel. Optionally, the Mack matrix layer includes a non-sensing portion, and a plurality of sensing portions spaced apart from the non-sensing portion. Optionally, the touch control display panel further includes a first electrode layer including a plurality of first electrode blocks respectively between the plurality of sensing portions and the base substrate; and a second electrode layer including a plurality of second electrode blocks respectively on a side of the plurality of sensing portions away from the first electrode layer. Optionally, a respective one of the plurality of sensing portions is configured to undergo a restorable change in electrical resistivity in response to a pressure from a touch.

As used herein, the term "restorable" in the context of the present disclosure refers to that the electrical resistivity undergoes a change in response to a pressure from a touch, and is capable of substantially regaining its original value (e.g., within ±10%, within ±5%, ±2%, within ±1%, within ±0.5%, within ±0.1%, of the original value) upon withdrawal of the pressure. Optionally, the plurality of sensing portions is made of a material including a conductive material mixed in a matrix material. The content of the conductive material in the matrix material is in a percolation region, in which the electrical resistivity is sensitive to external pressure or other stimuli.

Figure 1:
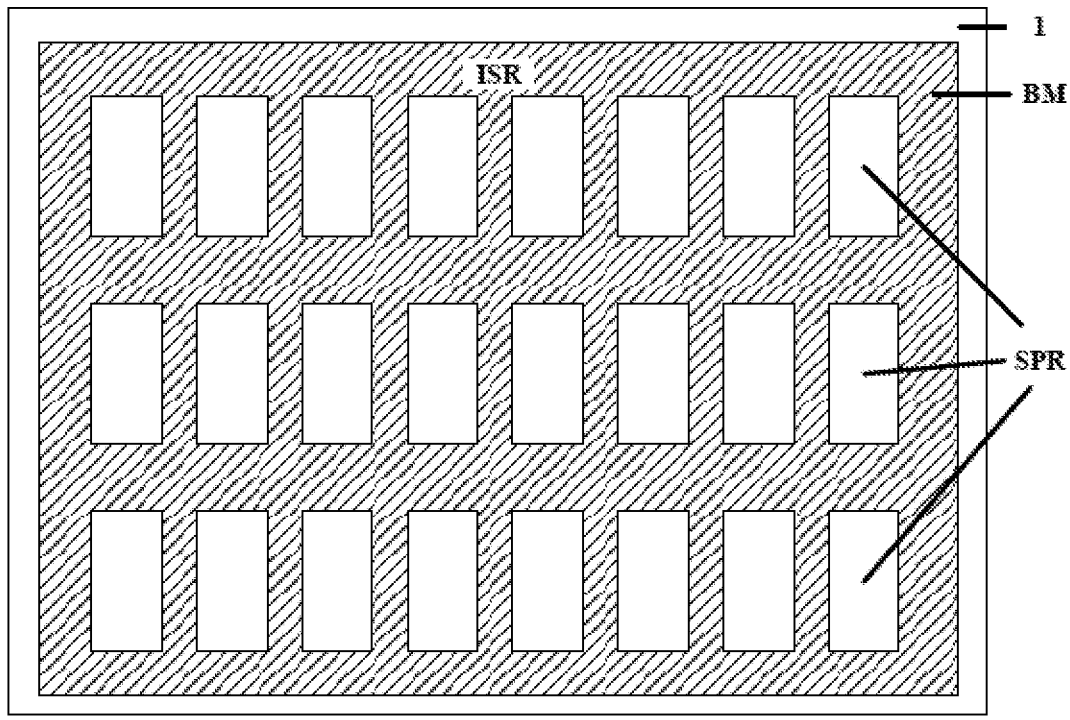
FIG. 1 is a plan view of a plurality of subpixel regions and an inter-subpixel region of a touch control display panel in some embodiments according to the present disclosure.

FIG. 1 is a plan view of a plurality of subpixel regions and an inter-subpixel region of a touch control display panel in some embodiments according to the present disclosure. In some embodiments, referring to FIG. 1, the touch control display panel include a base substrate 1, and a black matrix layer MB on the base substrate 1. Optionally, the black matrix layer MB is in an inter-subpixel region ISR of the touch control display panel, and defines a plurality of subpixel regions SPR.

As used herein, the term "subpixel region" refers to a light emission region of a subpixel, such as a region corresponding to a pixel electrode in a liquid crystal display panel, a region corresponding to a light emissive layer in an organic light emitting diode display panel, or a region corresponding to the plurality of light emitting elements in the present disclosure. Optionally, a pixel may include a number of separate light emission regions corresponding to a number of subpixels in the pixel Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

As used herein, the term "inter-subpixel region" refers to a region between adjacent subpixel regions, such as a region corresponding to a blade matrix in a liquid crystal display, a region corresponding a pixel definition layer in an organic light emitting diode display panel, or a black matrix layer in the preset disclosure. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

Figure 2:
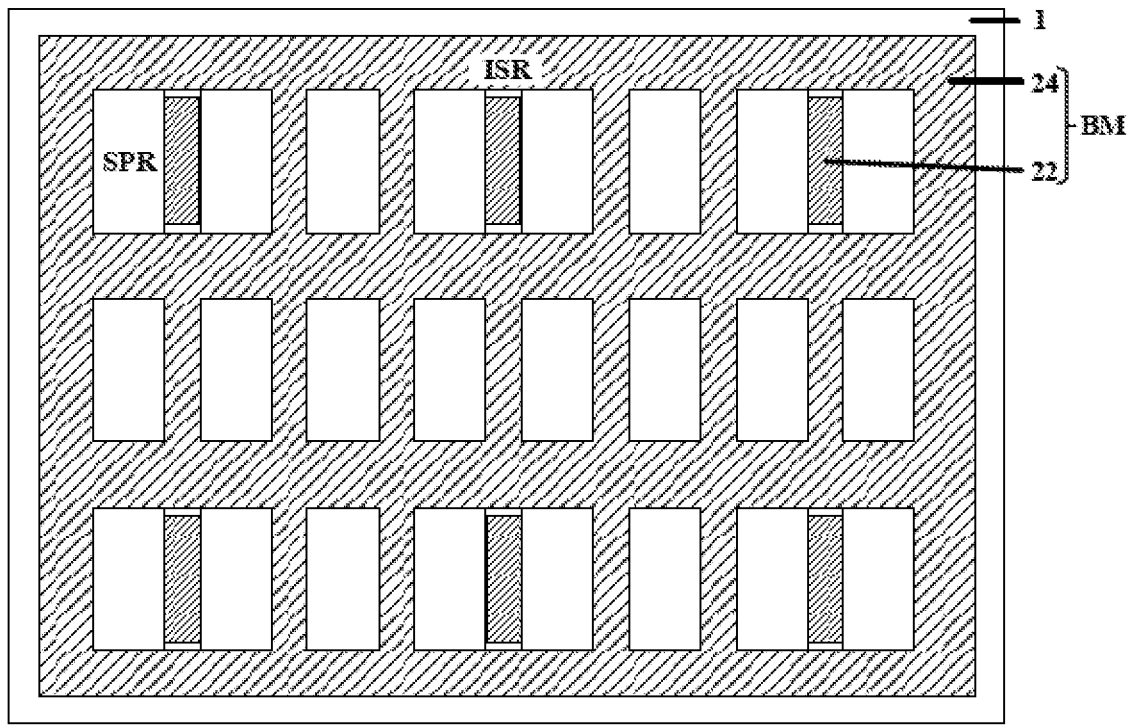
FIG. 2 is a plan view of a plurality of subpixel regions and an inter-subpixel region of a touch control display panel in some embodiments according to the present disclosure.

FIG. 2 is a plan view of a plurality of subpixel regions and an inter-subpixel region of a touch control display panel in some embodiments according to the present disclosure. In some embodiments, the black matrix layer BM includes a non-sensing portion 24, and a plurality of sensing portions 22 spaced apart from the non-sensing portion 24. The three continuous dots in FIG. 2 means that there are one or more rows/columns of subpixel regions in FIG. 2. In one example, in a same row of sensing portions, there are one or more columns of subpixel regions between two adjacent sensing portions of the blade matrix layer BM. In another example, in a same column of sensing portions, there are one or more rows of subpixel regions between two adjacent sensing portions of the black matrix layer BM.

In one example, in a same row of sensing portions, there are 50 to 100 columns (e.g., 50 to 60 columns, 60 to 70 columns, 70 to 80 columns, 80 to 90 columns, and 90 to 100 columns) of subpixel regions (a pixel regions includes one or more subpixel regions) between two adjacent sensing portions of the black matrix layer. Optionally, in a same row of sensing portions, a distance along a row direction and between two adjacent sensing portions of the black matrix layer are approximately 2.5 mm to approximately 5 mm. e.g., approximately 2.5 mm to approximately 3 mm, approximately 3 mm to approximately 3.5 mm, approximately 3.5 mm to approximately 4 mm, approximately 4 mm to approximately 4.5 mm, and approximately 4.5 mm to approximately 5 mm.

In another example, in a same column of sensing portions, there are 50 to 100 rows (e.g., 50 to 60 rows, 60 to 70 rows, 70 to 80 rows, 80 to 90 rows, and 90 to 100 rows) of subpixel regions (a pixel regions includes one or more subpixel regions) between two adjacent sensing portions of the Made matrix layer. Optionally, in a same column of sensing portions, a distance along a column direction and between two adjacent sensing portions of the black matrix layer are approximately 2.5 mm to approximately 5 mm, e.g., approximately 2.5 mm to approximately 3 mm, approximately 3 mm to approximately 3.5 mm, approximately 3.5 mm to approximately 4 mm, approximately 4 mm to approximately 4.5 mm, and approximately 4.5 mm to approximately 5 mm, the distance between two adjacent sensing portions not only can satisfies requirements for accurate detection of the position and pressure of a touch, but also keep the cost of fabricating the touch control display panel low.

Figure 3:
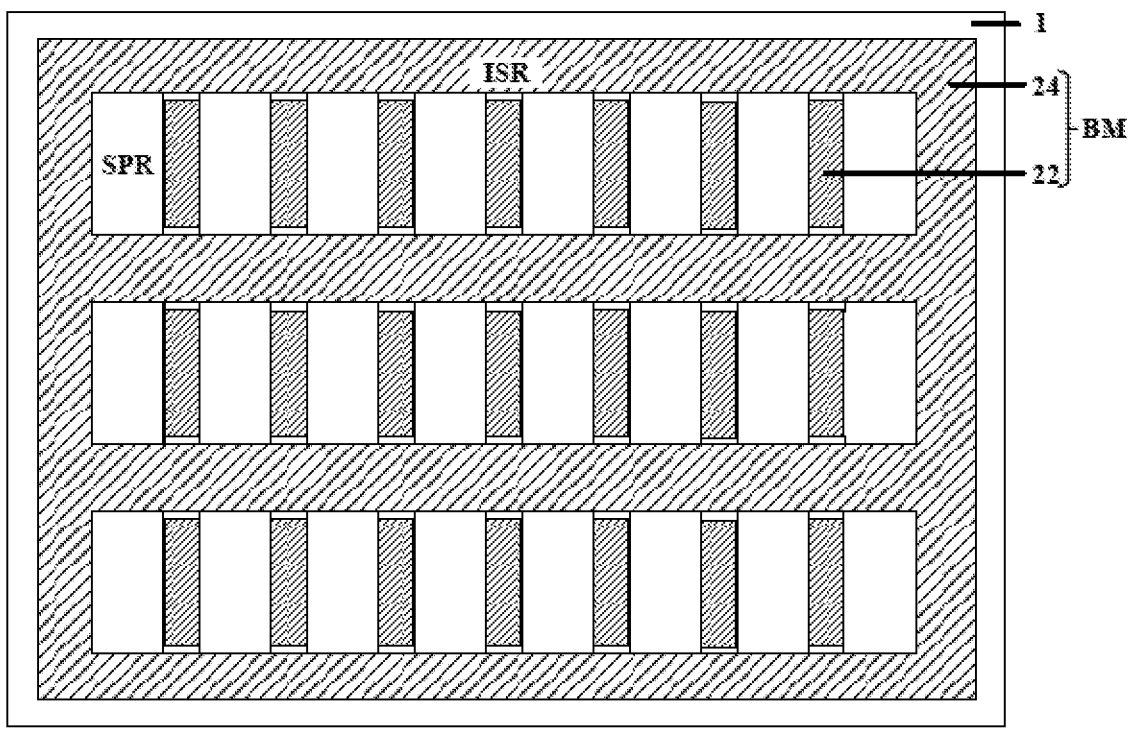
FIG. 3 is a plan view of a plurality of subpixel regions and an inter-subpixel region of a touch control display panel in some embodiments according to the present disclosure.

FIG. 3 is a plan view of a plurality of subpixel regions and an inter-subpixel region of a touch control display panel in some embodiments according to the present disclosure. Referring to FIG. 3, in some embodiments, a respective one of the plurality of sensing portions 22 of the black matrix layer BM corresponds to a respective one of the plurality of subpixel regions SPR. In a same row of sensing portions, there are one column of subpixel regions between two adjacent sensing portions of the blade matrix layer BM. In another example, in a same column of sensing portions, there are one rows of subpixel regions between two adjacent sensing portions of the blade matrix layer BM.

Figure 4:
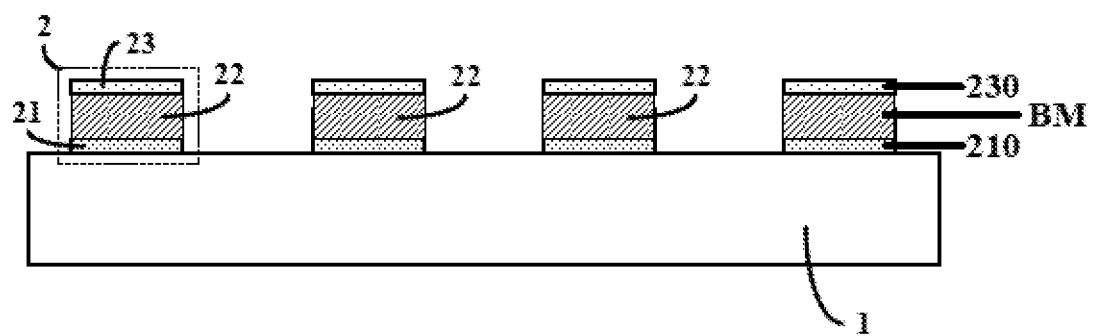
FIG. 4 is a cross-sectional view of a plurality of touch units in some embodiments according to the present disclosure.
Figure 5:
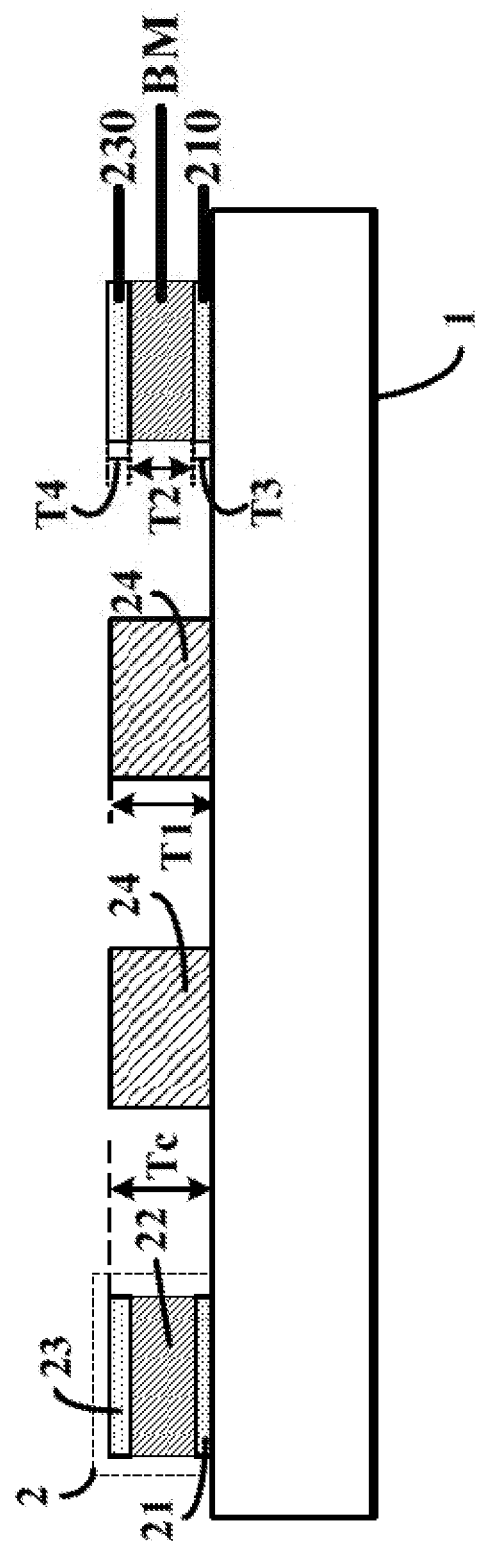
FIG. 5 is a cross-sectional view of a plurality of touch units in some embodiments according to the present disclosure.

FIG. 4 is a cross-sectional view of a plurality of touch units in some embodiments according to the present disclosure. FIG. 5 is a cross-sectional view of a plurality of touch units in some embodiments according to the present disclosure. In some embodiments, referring to FIG. 4 and FIG. 5, the touch control display panel further includes a first electrode layer 210 including a plurality of first electrode blocks 21 respectively between the plurality of sensing portions 22 and the base substrate 1, and a second electrode layer 230 including a plurality of second electrode blocks 23 respectively on a side of the plurality of sensing portions 22 away from the first electrode layer 210.

Optionally, a respective one of the plurality of sensing portions 22 is configured to undergo a restorable change in electrical resistivity in response to a pressure from a touch, to detect the pressure of the touch, as well as a position of the touch. For example, when there is a pressure on the respective one of the plurality of sensing portions 22, the electrical resistivity of the respective one of the plurality of sensing portions 22 changes, by detecting the changes of the electrical resistivity of the respective one of the plurality of sensing portions 22, the pressure level and the position of the pressure can be detected, which allows the touch control to become possible. The plurality of sensing portions 22 can convert changes of electrical resistivity to voltage signals, for example, one of the plurality of sensing portion 22 transmits a voltage signal to an integrated circuit, so that the voltage signal is detected by the integrated circuit, the pressure level of the touch on the one of the plurality of sensing portion 22 is measured, and the touch position corresponding to the one of the plurality of sensing portion is also captured.

Optionally, the plurality of first electrode blocks 21 are respectively in direct contact with the plurality of sensing portions 22. Optionally, the plurality of second electrode blocks 23 are respectively in direct contact with the plurality of sensing portions 22.

Optionally, a respective one of the plurality of first electrode blocks 21, the respective one of the plurality of sensing portions 22, and a respective one of the plurality of second electrode blocks 23 form a touch unit 2 configured to detect a change in electrical resistivity in the respective one of the plurality of sensing portions 22 in response to the pressure from the touch.

Figure 6:
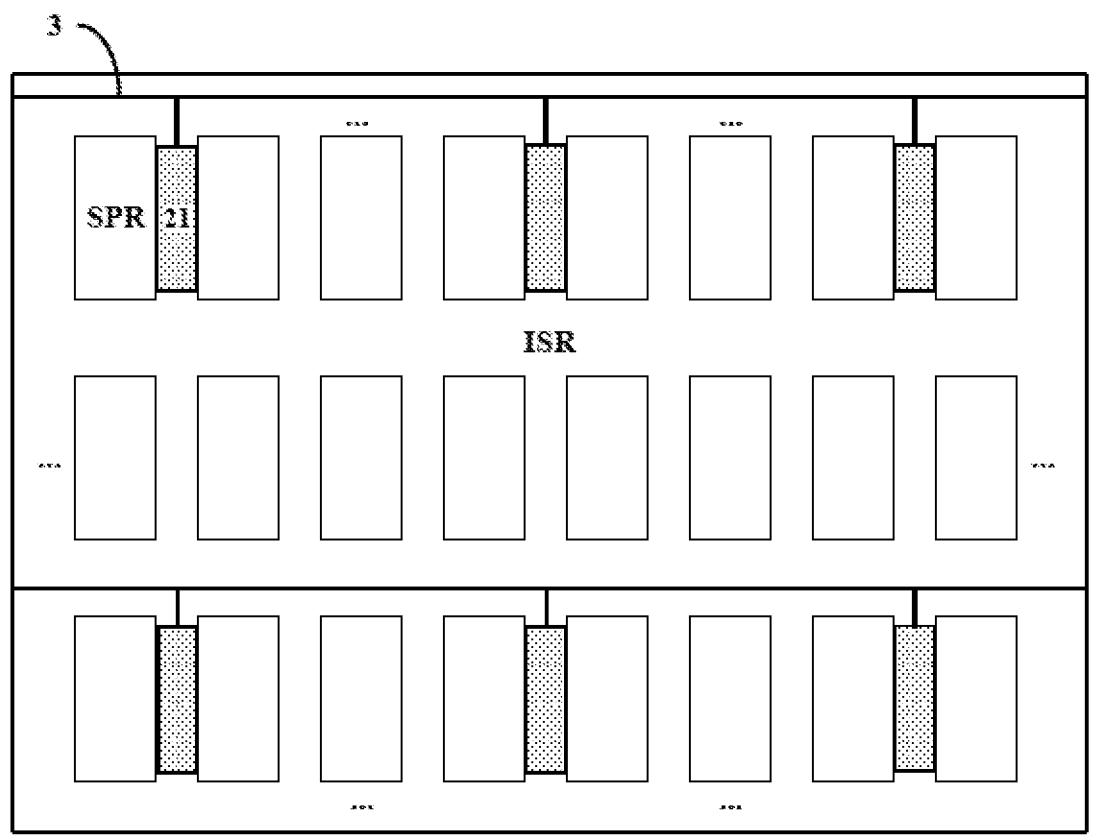
FIG. 6 is a plan view of a first electrode layer in some embodiments according to the present disclosure.

FIG. 6 is a plan view of a first electrode layer in some embodiments according to the present disclosure. Referring to FIG. 6 and FIG. 2, in some embodiments, the plurality of first electrode blocks 21 are in the inter-subpixel regions ISR. Optionally, a respective one of the plurality of first electrode blocks 21 is abutting a boundary of a corresponding subpixel region. Optionally, one or more rows/columns of subpixel regions are between two adjacent first electrode blocks 21. In one example, in a same row of first electrode blocks, there are one or more columns of subpixel regions between two adjacent first electrode blocks. In another example, in a same column of first electrode blocks, there are one or more rows of subpixel regions between two adjacent first electrode blocks.

Optionally, a respective one of the plurality of first electrode blocks 21 corresponds to a respective one of the plurality of subpixel regions SPR. For example, the respective one of the plurality of first electrode blocks 21 is abutting a boundary of the respective one of the plurality of subpixel regions SPR.

Figure 7:
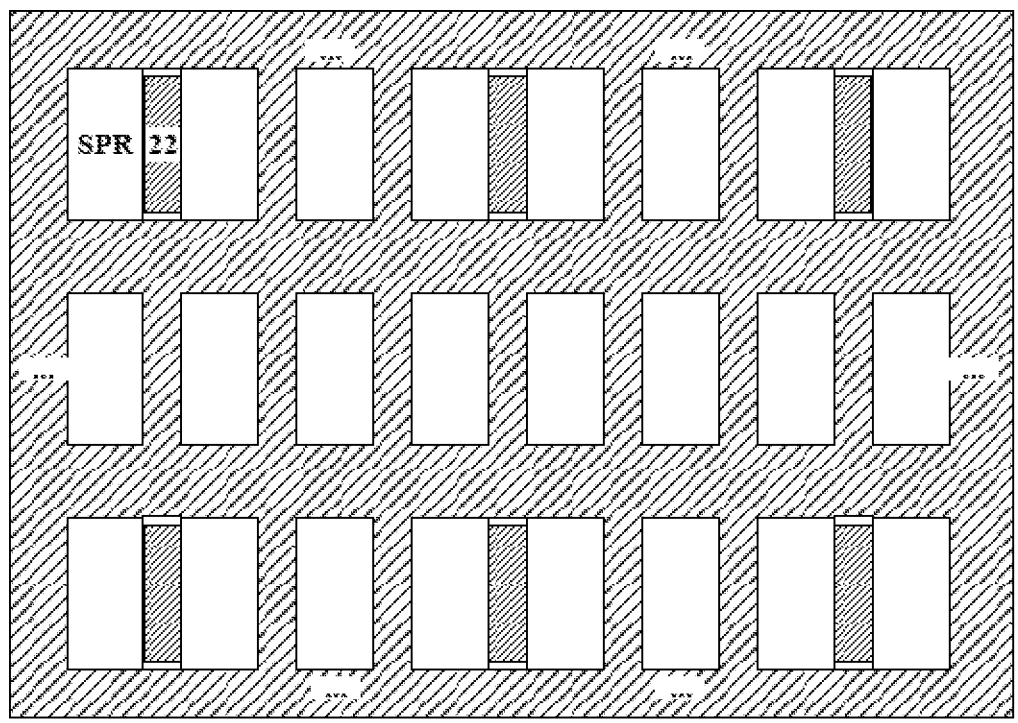
FIG. 7 is a plan view of a black matrix layer in some embodiments according to the present disclosure.

FIG. 7 is a plan view of a black matrix layer in some embodiments according to the present disclosure. Referring to FIG. 7, in some embodiments, the plurality of sensing portions 22 are in the inter-subpixel regions ISR. Optionally, a respective one of the plurality of sensing portions 22 is abutting a boundary of the corresponding subpixel region. Optionally, one or more rows/columns of subpixel regions are between two adjacent sensing portions 22. In one example, in a some row of sensing portions, there are one or more columns of subpixel regions between two adjacent sensing portions. In another example, in a same column of sensing portions, there is one or more rows of subpixel regions between two adjacent sensing portions.

Optionally, a respective one of the plurality of sensing portions 22 corresponds to the respective one of the plurality of subpixel regions SPR. For example, the respective one of the plurality of sensing portions 22 is abutting a boundary of the respective one of the plurality of subpixel regions SPR.

Figure 8:
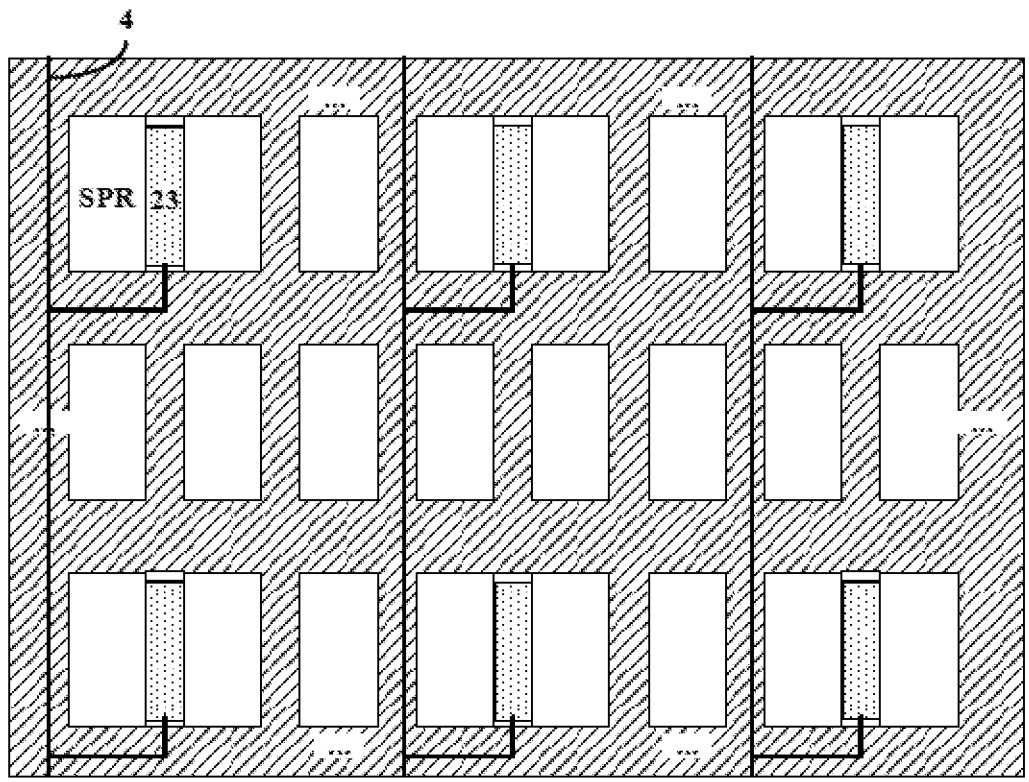
FIG. 8 is a plan view of a second electrode layer in some embodiments according to the present disclosure.

FIG. 8 is a plan view of a second electrode layer in some embodiments according to the present disclosure. Referring to FIG. 8, in some embodiments, the plurality of second electrode blocks 23 are in the inter-subpixel regions ISR. Optionally, a respective one of the plurality of second electrode blocks 23 is abutting a boundary of the corresponding subpixel region. Optionally, one or more rows or columns of subpixel regions are between two adjacent searing portions 22. In one example, in a same row of second electrode blocks, there are one or more columns of subpixel regions between two adjacent second electrode blocks. In another example, in a same column of second electrode blocks, there are one or more rows of subpixel regions between two adjacent second electrode blocks.

Optionally, a respective one of the plurality of second electrode blocks 23 corresponds to the respective one of the plurality of subpixel regions SPR. For example, the respective one of the plurality of second electrode blocks 23 is abutting a boundary of the respective one of tire plurality of subpixel regions SPR.

Figure 9:
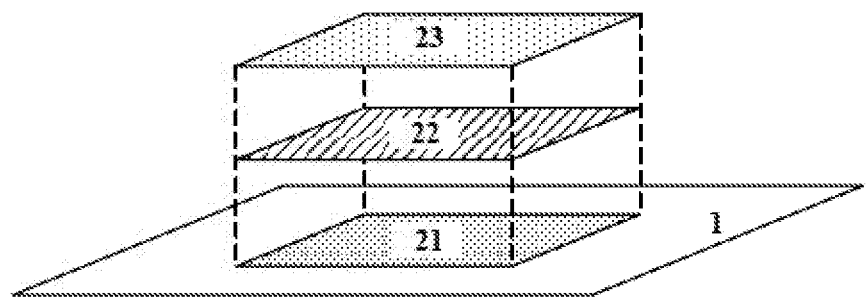
FIG. 9 is a schematic diagram of a respective one of a plurality of touch units in some embodiments according to the present disclosure.

FIG. 9 is a schematic diagram of a respective one of a plurality of touch units in some embodiments according to the present disclosure. In some embodiments, referring to FIG. 6, FIG. 7, and FIG. 9, an orthographic projection of the respective one of the plurality of first electrode Modes 21 on the base substrate 1 at least partially overlaps with an orthographic projection of the respective one of the plurality of sensing portions 22 on the base substrate 1. Optionally, the orthographic projection of the respective one of the plurality of first electrode blocks 21 on the base substrate 1 partially overlaps with the orthographic projection of the respective one of the plurality of sensing portions 22 on the base substrate 1. Optionally, the orthographic projection of the respective one of the plurality of first electrode blocks 21 on the base substrate 1 substantially overlaps with the orthographic projection of the respective one of the plurality of sensing portions 22 on the base substrate 1.

As used herein, the term "substantially overlap" refers to two orthographic projections at least 50%, e.g., at least 60%, at least 70%, at least 80%, at least 90%, at least 95%, at least 99%, and 100%, overlapping with cadi other. For example, the orthographic projection of the respective one of the plurality of first electrode blocks 21 on the base substrate 1 and the orthographic projection of the respective one of the plurality of sensing portions 22 on the base substrate 1 are at least 50% overlapping with each other.

In some embodiments, referring to FIG. 7, FIG. 8, and FIG. 9, an orthographic projection of the respective one of the plurality of second electrode blocks 23 on the base substrate 1 at least partially overlaps with the orthographic projection of the respective one of the plurality of sensing portions 22 on the base substrate 1. Optionally, the orthographic projection of the respective one of the plurality of second electrode Modes 23 on the base substrate 1 partially overlaps with the orthographic projection of the respective one of the plurality of sensing portions 22 on the base substrate 1. Optionally, the orthographic projection of the respective one of the plurality of second electrode blocks 23 on the base substrate 1 substantially overlaps with the orthographic projection of the respective one of the plurality of sensing portions 22 on the base substrate 1.

In some embodiments, referring to FIG. 6, FIG. 8, and FIG. 9, the orthographic projection of the respective one of the plurality of second electrode Modes 23 on the base substrate 1 at least partially overlaps with the orthographic projection of the respective one of the plurality of first electrode blocks 21 on the base substrate 1. Optionally, the orthographic projection of the respective one of the plurality of second electrode blocks 23 on the base substrate 1 partially overlaps with the orthographic projection of the respective one of the plurality of first electrode blocks 21 on the base substrate 1. Optionally, the orthographic projection of the respective one of the plurality of second electrode blocks 23 on the base substrate substantially overlaps with the orthographic projection of the respective one of the plurality of first electrode blocks 21 on the base substrate 1.

In some embodiments, referring to FIG. 5, a thickness T1 of the non-sensing portion 24 is substantially the same as a thickness T2 of each of the plurality of sensing portions 22. In some embodiments, the thickness T1 of the non-sensing portion 24 is greater than a thickness T2 of each of the plurality of sensing portions 22. Optionally, a combined thickness Tc of the respective one of the plurality of first electrode blocks 21, the respective one of the plurality of sensing portions 22, and the respective one of the plurality of second electrode blocks 23 in the touch unit 2 is substantially the same as the thickness T1 of the non-sensing portion.

As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01% of the base value.

Optionally, a thickness T3 of the respective one of the plurality of first electrode blocks 21 is in a range of 3000 Å to 5000 Å, e.g., 3000 Å to 2500 Å, 3500 Å to 4000 Å, 4000 Å to 4500 Å, and 4500 Å to 5000 Å.

Optionally a thickness T2 of the respective one of the plurality of sensing portions 22 is in a range of 2 μm to 3 μm, e.g., 2 μm to 2.2 μm, 2.2 μm to 2.4 μm, 2.4 μm to 2.6 μm, 2.6 μm to 2.8 μm, and 2.8 μm to 3 μm.

Optionally a thickness T4 of the respective one of the plurality of second electrode blocks 23 is in a range of 3000 Å to 5000 Å, e.g., 3000 Å to 3500 Å, 3500 Å to 4000 K 4000 Å to 4500 Å, and 4500 Å to 5000 Å.

In some embodiments, the non-sensing portion 24 and the plurality of sensing portions 22 includes a same conductive black material. Optionally, the non-sensing portion 24 and the plurality of sensing portions 22 together form the black matrix layer BM extending substantially throughout an entirety of the inter-subpixel region ISR, which may reduce the adverse effect of the ambient light on the display performance of the touch control display panel, and ensure a high display quality.

Various appropriate conductive black materials and various appropriate fabricating methods may be used to make the non-sensing portion 24 or the plurality of sensing portions 22. For example, a conductive black material may be deposited on the substrate (e.g., by sputtering, vapor deposition, so hit ion coating, or spin coating); and patterned (e.g., by lithography such as a wet etching process) to form the non-sensing portion 24 and/or the plurality of sensing portions 22. Examples of appropriate conductive black materials for making the non-sensing portion 24 and/or the plurality of sensing portions 22 include, but are not limited to, organic or inorganic conductive blade materials. Optionally, the conductive black material includes a black conductive particle dispersed in a polymer matrix. For example, the black conductive particle is soot carbon, the polymer matrix includes a black polyimide materials. Optionally, the non-sensing portion 24 and the plurality of sensing portions 22 are formed using processes including coating, exposing, and developing, which may simplify the process of fabricating the touch control display panel.

As used herein, the term "substantially throughout" refers to at least 50%, at least 60%, at least 70%, at least 80%, at least 90%, at least 95%, at least 99%, or 100% throughout. For example, the black matrix layer extends at least 50%, at least 60%, at least 70%, at least 80%, at least 90%, at least 95%, at least 99%, or 100% throughout the inter-subpixel region ISR.

Using a conductive black, material to form the plurality of sensing portions, the plurality of sensing portions can not only be used to perform touch control function, but also absorb a portion of ambient light to reduce or prevent the ambient light from being reflected by the touch control display panel. Compared with a display panel haring an external touch substrate, the touch control display substrate described herein is thinner than the display panel having the external touch substrate, and the touch control display substrate can reduce and prevent ambient light from being reflected by the touch control display substrate, resulting in an adverse effect on the display performance of the touch control display substrate.

Optionally, the non-sensing portion 24 and the plurality of sensing portions 22 are harmed using a same process. Optionally, the non-sensing portion 24 and the plurality of sensing portions 22 are formed using different processes.

Optionally, polarizers are absent from the plurality of subpixel regions of the touch control display panel so that the touch control display substrate is thinner.

Various appropriate materials may be used form making the first electrode layer and the second electrode layer. Examples of materials suitable for making the first electrode layer and the second electrode layer include, but are not limited to, metal materials and non-metal materials.

Examples of appropriate metal electrode materials include, but are not limited to, copper, aluminum, silver, molybdenum, chromium, neodymium, nickel, manganese, titanium, tantalum, and tungsten. Examples of appropriate non-metal electrode materials include, but are not limited to, various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Optionally, the first electrode layer 210 includes a substantially transparent conductive material. Optionally, the second electrode layer 230 includes a substantially transparent conductive material.

Optionally, the first electrode layer 210 includes a non-reflective material. Optionally, the second electrode layer 230 includes a non-reflective material. For example, the plurality of first electrode blocks 21 and the plurality of second electrode blocks 23 are formed using processes including, but not limited to depositing, exposing, developing, and etching.

As used herein, the term "substantially transparent" means at least 50 percent (e.g., at least 60 percent at least 70 percent, at least 80 percent at least 90 percent, and at least 95 percent) of an incident light in the visible wavelength range transmitted therethrough.

Various appropriate materials may be used for making the base substrate. Examples of materials suitable for making the base substrate include, but ore not limited to, organic film, inorganic film, and a combination of organic films and inorganic films. Optionally, the base substrate can be used to encapsulate the plurality of tight emitting elements. Moreover, the base substrate having the plurality of sensing portions and a non-sensing portion is used to replace a polarizer in the plurality of subpixel regions, resulting in a thinner display panel.

In some embodiments, referring to FIG. 6 to FIG. 8, the plurality of first electrode blocks 21 are arranged in a form of array in the touch control display panel. The plurality of sensing portions 22 of the black matrix layer BM are arranged in a form of array in the touch control display panel. The plurality of second electrode blocks 23 are arranged in a form of array in the touch control display panel. The plurality of touch units are therefore arranged in a form of array in the (ouch control display panel.

The plurality of sensing portions 22 and the non-sensing portion 24 together substantially covers the inter-subpixel region ISR, so that ambient light can be absorbed by the plurality of sensing portions and the non-sensing portion. It is unnecessary to have polarizers in the plurality of subpixel regions SPR to prevent the ambient light from being reflected out of the display panel. The touch control display panel described herein can reduce the adverse effect of the ambient light, and lower the cost of fabricating the touch control display panel.

In some embodiments, referring to FIG. 6, the touch control display panel further includes a plurality of first signal lines 3 respectively electrically connected to the plurality of first electrode blocks 21, to apply a common voltage to the plurality of first electrode blocks 21.

In some embodiments, referring to FIG. 8, the touch control display panel further includes a plurality of second signal lines 4 respectively electrically connected to the plurality of second electrode blocks 23, to transmit sensing signals from the plurality of second electrode blocks 23 to an integrated circuit, e.g., a touch control integrated circuit.

Figure 10:
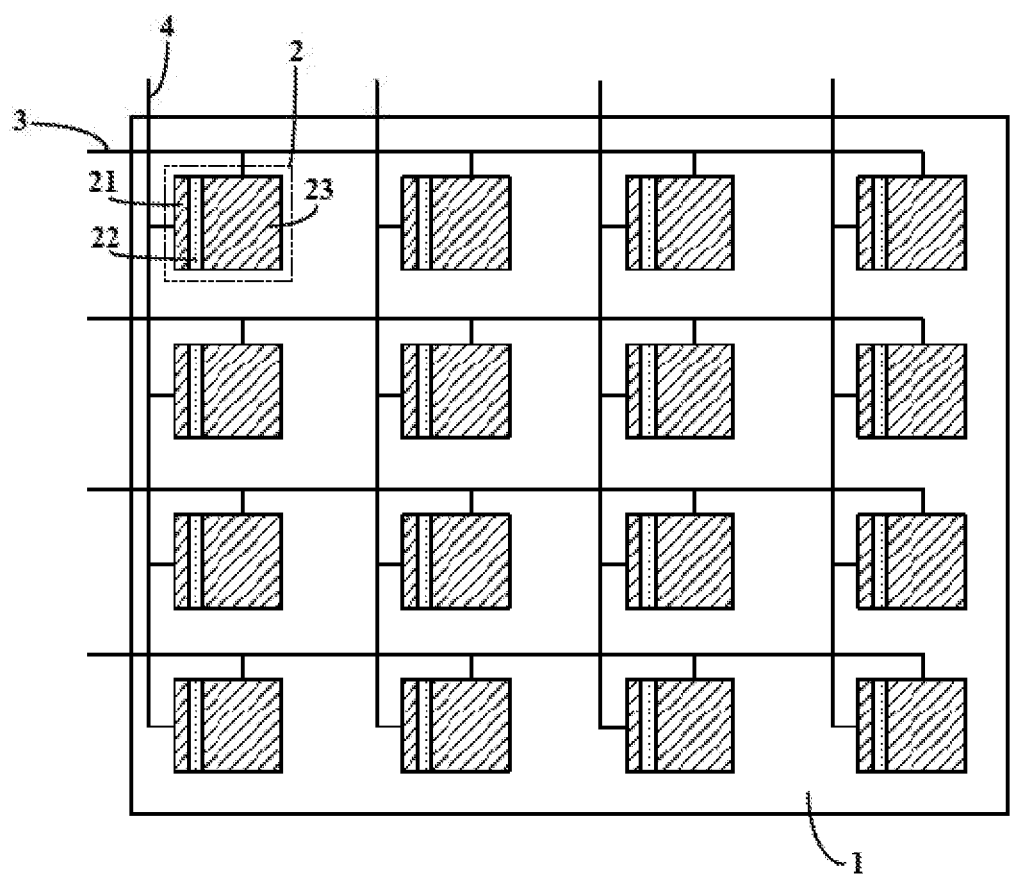
FIG. 10 is a plan view of a first electrode layer, a second electrode layer, and a plurality of sensing portions of a black matrix layer in some embodiments according to the present disclosure.

FIG. 10 is a plan view of a first electrode layer, a second electrode layer, and a plurality of sensing portions of a black matrix layer in some embodiments according to the present disclosure. Optionally, referring to FIG. 10, the plurality of first signal lines 3 cross over the plurality of second signal lines 4. For example, a respective one of the plurality of first signal lines 3 cross over the plurality of second signal lines 4. A respective one of the plurality of second signal lines 4 cross over the plurality of first signal lines 3.

The plurality of lint signal lines 3 and the plurality of second signal lines 4 together perform touch scanning. For example, the plurality of first signal lines 3 are scanned one by one at a certain timing sequence, e.g., a common voltage are applied to the plurality of first signal tines 3 one by one at the certain timing sequence, and the plurality of second signal lines 4 respectively transmit voltage signals from the plurality of second electrode blocks to the integrated circuit to detect voltage changes of the plurality of second electrode blocks.

Figure 11:
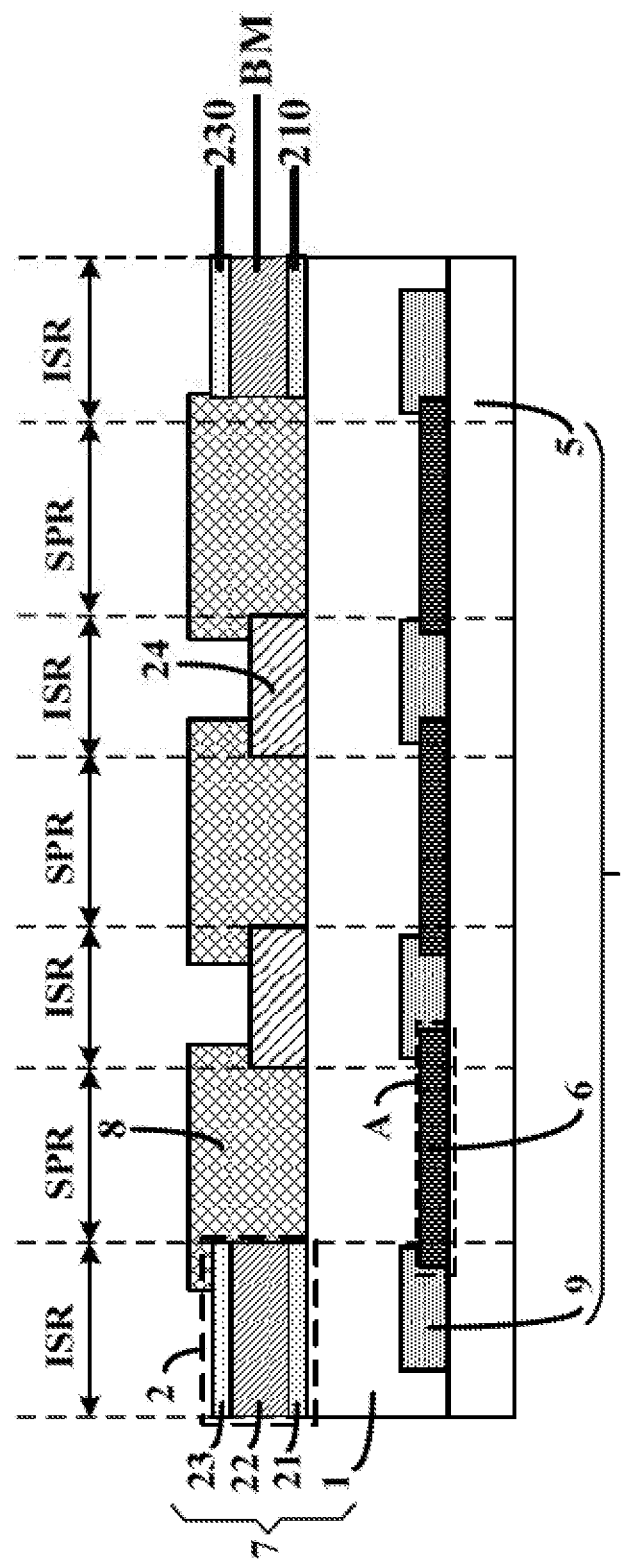
FIG. 11 is a cross-sectional view of a touch control display panel in some embodiments according to the present disclosure.

FIG. 11 is a cross-sectional view of a touch control display panel in some embodiments according to the present disclosure. In some embodiments, referring to FIG. 11, the non-sensing portion 24 and the plurality of sensing portions 22 together define the plurality of subpixel regions SPR Optionally, the touch control display panel further includes a plurality of color filter blocks 8 respectively in the plurality of subpixel regions SPR, and on array substrate 10 including a plurality of light emitting elements 6 respectively in the plurality of subpixel regions SPR. Optionally, the plurality of color fiber blocks 8 are on a side of the base substrate 1 away from the plurality of light emitting elements 6. Optionally, an orthographic projection of a respective one of the plurality of color filter blocks 8 on the base substrate 1 covers an orthographic projection of a respective one of the plurality of light emitting elements 6, so that light having a certain wavelength range emitted from the respective one of the plurality of light emitting elements 6 can be selected and transmitted through the respective one of the plurality of color filter blocks 8, and the adverse effect of ambient light is reduced, and it is unnecessary to have polarizers in the plurality of subpixel regions, and the thickness of the touch control display panel is reduced.

Optionally, the plurality of fight emitting elements 6 is arranged in a form of array in the touch control display panel. Optionally, a respective one of the plurality of light emitting elements 6 is an organic light emitting element.

Optionally, the array substrate includes a support substrate 5, a pixel definition layer 9 on the support substrate 5 defining a plurality of subpixel apertures A. A respective one of the plurality of light emitting elements 6 is disposed in a respective one of the plurality of the subpixel apertures A.

FIG. 12 is a schematic diagram of a respective one of a plurality of touch units and a pixel definition layer in some embodiments according to the present disclosure. Referring to FIG. 11 and FIG. 12, optionally, an orthographic projection of a touch unit 2 on the base substrate 1 partially overlaps with an orthographic projection of the pixel definition layer 9 oil the base substrate 1.

Optionally, the orthographic projection of the respective one of the plurality of sensing portion 22 on the base substrate 1 partially overlaps with an orthographic projection of a corresponding light emitting element on the base substrate 1. For example, the respective one of the plurality of sensing portion 22 extends into a region corresponding to the corresponding light emitting dement.

In another aspect, the present disclosure provides a touch control display apparatus. In some embodiments, the touch control display apparatus includes the touch control display panel described herein, and one or more integrated circuits connected to the touch control display panel.

Examples of appropriate touch control display apparatuses include, but are not limited to, an electronic paper, a mobile phone, a tablet computer, a television, a monitor, a notebook computer, a digital album, a GPS, etc.

In another aspect, the present disclosure provides a touch substrate. In some embodiments, referring to FIG. 11, the touch substrate includes a base substrate 1, a black matrix layer BM on the base substrate 1 and in an inter-subpixel region ISR of the touch substrate. Optionally, the black matrix layer BM includes a non-sensing portion 24, and a plurality of sensing portions 22 spaced apart from the non-sensing portion 24. Optionally, the touch substrate further includes a first electrode layer 210 including a plurality of first electrode blocks 21 respectively between the plurality of sensing portions 22 and the base substrate 1; and a second electrode layer 230 including a plurality of second electrode blocks 23 respectively on a side of the plurality of sensing portions 22 away from the first electrode layer 210. Optionally, a respective one of the plurality of sensing portions 22 is configured to undergo a restorable change in electrical resistivity in response to a pressure from a touch.

Optionally, the plurality of first electrode blocks 21 are respectively in direct contact with the plurality of sensing portions 22. Optionally, the plurality of second electrode blocks 23 are respectively in direct contact with the plurality of sensing portions 22. Optionally, a respective one of the plurality of first electrode blocks 21, the respective one of the plurality of sensing portions 22, and a respective one of the plurality of second electrode blocks 23 form a touch unit 2 configured to detect a change in electrical resistivity in the respective one of the plurality of sensing portions 22 in response to the pressure from the touch.

In some embodiments, referring to FIG. 11 and FIG. 12, an orthographic projection of the respective one of the plurality of first electrode Modes 21 on the base substrate 1 at least partially overlaps with an orthographic projection of the respective one of the plurality of sensing portions 22 on the base substrate 1. In one example, the orthographic projection of the respective one of the plurality of first electrode blocks 21 on the base substrate 1 partially overlaps with the orthographic projection of the respective one of the plurality of sensing portions 22 on the base substrate 1. In another example, the orthographic projection of the respective one of (lie plurality of first electrode blocks 21 on the base substrate 1 substantially overlaps with the orthographic projection of the respective one of the plurality of sensing portions 22 on the base substrate 1.

In some embodiments, an orthographic projection of the respective one of the plurality of second electrode blocks 23 on the base substrate 1 at least partially overlaps with the orthographic projection of the respective one of the plurality of sensing portions 22 on the base substrate 1. In one example, the orthographic projection of the respective one of the plurality of second electrode blocks 23 on the base substrate 1 partially overlaps with the orthographic projection of the respective one of the plurality of sensing portions 22 on the base substrate 1. In another example, the orthographic projection of the respective one of the plurality of second electrode blocks 23 on the base substrate 1 substantially overlaps with the orthographic projection of the respective one of the plurality of sensing portions 22 on the base substrate 1.

In some embodiments, referring to FIG. 5, a thickness T1 of the non-sensing portion 24 is greater than a thickness T2 of each of the plurality of sensing portions 22. Optionally, a combined thickness Tc of the respective one of the plurality of first electrode blocks 21, the respective one of the plurality of sensing portions 22, and the respective one of the plurality of second electrode blocks 23 in the touch unit 2 is substantially the same as a thickness T1 of the non-sensing pardon 24, which allows layers to be formed easily on a side of the black matrix layer BM away from the base substrate 1.

Optionally, a thickness T3 of the respective one of the plurality of first electrode blocks 21 is in a range of 3000 Å to 5000 Å e.g., 3000 Å to 2500 Å 3300 Å to 4000 Å, 4000 Å to 4500 Å and 4500 Å to 5000 Å.

Optionally a thickness T2 of the respective one of the plurality of sensing portions 22 is in a range of 2 μm to 3 μm, e.g., 2 μm to 2.2 μm, 2.2 μm to 2.4 μm, 2.4 μm to 2.6 μm, 2.6 μm to 2.8 μm, and 2.8 μm to 3 μm.

Optionally a thickness T4 of the respective one of the plurality of second electrode blocks 232 is in a range of 3000 Å to 3000 Å e.g., 3000 Å to 3500 Å, 3500 Å to 4000 Å, 4000 Å to 4500 Å, and 4500 Å to 5000 Å.

In some embodiments, the non-sensing portion 24 and the plurality of sensing portions 22 includes a same conductive Mack material. Optionally, the non-sensing portion 24 and the plurality of sensing portions 22 together form the black matrix layer BM extending substantially throughout entirety of the inter-subpixel region SPR.

Optionally, the plurality of sensing portions 22 are arranged in a form of array in the touch substrate.

Optionally, the second electrode layer 230 includes a substantially transparent conductive material. Optionally, the second electrode layer 230 includes a non-reflective material.

In some embodiments, referring to FIG. 6. FIG. 8, and FIG. 11, the touch substrate 7 includes a plurality of first signal lines 3 respectively electrically connected to the plurality of first electrode blocks 21, and configured to apply a common voltage to the plurality of first electrode blocks 21; and a plurality of second signal lines 4 respectively electrically connected to the plurality of second electrode blocks 23, and configured to transmit sensing signals from the plurality of second electrode blocks 23 to an integrated circuit.

In another aspect, the present disclosure also provides a method of fabricating a touch control display panel. In some embodiments, the method of fabricating a touch control display panel includes providing a base substrate, and forming a blade matrix layer on a base substrate and in an inter-subpixel region of the touch control display panel.

Optionally, forming the Mack matrix layer includes forming a non-sensing portion, and forming a plurality of sensing portions spaced apart from the non-sensing portion.

In some embodiments, the method further includes forming a first electrode layer including a plurality of first electrode blocks respectively between the plurality of sensing portions and the base substrate; and forming a second electrode layer including a plurality of second electrode blocks respectively on a side of the plurality of sensing portions away from the first electrode layer.

In some embodiments, a respective one of the plurality of sensing portions is formed to undergo a restorable change in electrical resistivity in response to a pressure from a touch.

In some embodiments, the plurality of first electrode blocks are formed to be respectively in direct contact with the plurality of sensing portions. The plurality of second electrode blocks are formed to be respectively in direct contact with the plurality of sensing portions. A respective one of the plurality of first electrode blocks, the respective one of the plurality of sensing portions, and a respective one of the plurality of second electrode blocks form a touch unit to detect a change in electrical resistivity in the respective one of the plurality of sensing portions in response to the pressure from the touch.

In some embodiments, the method further includes forming a plurality of first signal lines respectively electrically connected to the plurality of first electrode blocks, and configured to apply a common voltage to the plurality of first electrode blocks; and forming a plurality of second signal lines respectively electrically connected to the plurality of second electrode blocks, and configured to transmit sensing signals from the plurality of second electrode blocks to an integrated circuit.

Optionally, forming the non-sensing portion, and forming the plurality of sensing portions are performed in a same process. Optionally, forming the non-sensing portion, and forming the plurality of sensing portions are performed in different processes. In one example, prior to forming the non-sensing portion, the plurality of sensing portions are formed. In another example, subsequent to forming the non-sensing portion, the plurality of sensing portions are formed.

Optionally, the non-sensing portion and the plurality of sensing portions are formed using a same conductive black material. The non-sensing portion and the plurality of sensing portions together form the black matrix layer extending substantially throughout an entirety of the inter-subpixel region. Optionally, the non-sensing portion and the plurality of sensing portions are formed so that a thickness of the non-sensing portion is greater than a thickness of each of the plurality of sensing portions. Optionally, a combined thickness of the respective one of the plurality of first electrode blocks, the respective one of the plurality of sensing portions, and the respective one of the plurality of second electrode blocks in the touch unit is substantially the same as a thickness of the non-sensing portion. Optionally, a thickness of the respective one of the plurality of first electrode blocks is in a range of 3000 Å to 5000 Å; a thickness of the respective one of the plurality of sensing portions is in a range of 2 µm to 3 µm; and a thickness of the respective one of the plurality of second electrode blocks is in a range of 3000 Å to 5000 Å.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first" "second", etc. following with main or dement. Such terms should be understood as a nomenclature and should not be construed as giving the limitation on the number of the dements modified by such nomenclature unless specific number has been given. Any advantages and benefits described may not apply to all embodiments of the invention. It should be appreciated that variations may be made m the embodiments described by persons skilled in the art without departing from the scope of the present invention as defined by the following claims. Moreover, no element and component in the present disclosure is intended to be dedicated to the public regardless of whether the dement or component is explicitly recited in the following claims.

What is claimed is:

1. A touch control display panel, comprising:
a base substrate; and
a black matrix layer on the base substrate and in an inter-subpixel region of the touch control display panel;
wherein the black matrix layer comprises a non-sensing portion, and a plurality of sensing portions spaced apart from the non-sensing portion;
wherein the touch control display panel further comprises:
a first electrode layer comprising a plurality of first electrode blocks respectively between the plurality of sensing portions and the base substrate; and
a second electrode layer comprising a plurality of second electrode blocks respectively on a side of the plurality of sensing portions away from the first electrode layer;
wherein a respective one of the plurality of sensing portions is configured to undergo a restorable change in electrical resistivity in response to a pressure from a touch,
the non-sensing portion and the plurality of sensing portions comprise a same conductive black material;
a same side of the base substrate is in direct contact with the non-sensing portion and in direct contact with the plurality of first electrode blocks;
the plurality of first electrode blocks are respectively in direct contact with the plurality of sensing portions; and
the plurality of second electrode blocks are respectively in direct contact with the plurality of sensing portions.

2. The touch control display panel of claim 1, wherein the plurality of first electrode blocks are respectively in direct contact with the plurality of sensing portions;
the plurality of second electrode blocks are respectively in direct contact with the plurality of sensing portions; and
a respective one of the plurality of first electrode blocks, the respective one of the plurality of sensing portions, and a respective one of the plurality of second electrode blocks form a touch unit configured to detect a change in electrical resistivity in the respective one of the plurality of sensing portions in response to the pressure from the touch.

3. The touch control display panel of claim 2, wherein an orthographic projection of the respective one of the plurality of first electrode blocks on the base substrate at least partially overlaps with an orthographic projection of the respective one of the plurality of sensing portions on the base substrate; and
an orthographic projection of the respective one of the plurality of second electrode blocks on the base substrate at least partially overlaps with the orthographic projection of the respective one of the plurality of sensing portions on the base substrate.

4. The touch control display panel of claim 1, wherein a thickness of the non-sensing portion is greater than a thickness of each of the plurality of sensing portions.

5. The touch control display panel of claim 2, wherein a combined thickness of the respective one of the plurality of first electrode blocks, the respective one of the plurality of sensing portions, and the respective one of the plurality of second electrode blocks in the touch unit is substantially the same as a thickness of the non-sensing portion.

6. The touch control display panel of claim 5, wherein a thickness of the respective one of the plurality of first electrode blocks is in a range of 3000 Å to 5000 Å;
   a thickness of the respective one of the plurality of sensing portions is in a range of 2 μm to 3 μm; and
   a thickness of the respective one of the plurality of second electrode blocks is in a range of 3000 Å to 5000 Å.

7. The touch control display panel of claim 1, further comprising:
   a plurality of first signal lines respectively electrically connected to the plurality of first electrode blocks, and configured to apply a common voltage to the plurality of first electrode blocks; and
   a plurality of second signal lines respectively electrically connected to the plurality of second electrode blocks, and configured to transmit sensing signals from the plurality of second electrode blocks to an integrated circuit.

8. The touch control display panel of claim 1, wherein the plurality of sensing portions are arranged in a form of array in the touch control display panel.

9. The touch control display panel of claim 1, wherein the non-sensing portion and the plurality of sensing portions together define a plurality of subpixel regions;
   the touch control display panel further comprises a plurality of color filter blocks respectively in the plurality of subpixel regions;
   a respective one of the plurality of non-sensing portions is in direct contact with at least one adjacent color filter block; and
   the respective one of the plurality of sensing portions, a respective one of the plurality of first electrode blocks, a respective one of the plurality of second electrode blocks are in direct contact with a same adjacent color filter block.

10. A touch control display apparatus, comprising the touch control display panel of claim 1, and one or more integrated circuits connected to the touch control display panel.

11. A touch substrate, comprising:
   a base substrate; and
   a black matrix layer on the base substrate and in an inter-subpixel region of the touch substrate;
   wherein the black matrix layer comprises a non-sensing portion, and a plurality of sensing portions spaced apart from the non-sensing portion;
   wherein the touch substrate further comprises:
   a first electrode layer comprising a plurality of first electrode blocks respectively between the plurality of sensing portions and the base substrate; and
   a second electrode layer comprising a plurality of second electrode blocks respectively on a side of the plurality of sensing portions away from the first electrode layer;
   wherein a respective one of the plurality of sensing portions is configured to undergo a restorable change in electrical resistivity in response to a pressure from a touch;
   the non-sensing portion and the plurality of sensing portions comprise a same conductive black material;
   a same side of the base substrate is in direct contact with the non-sensing portion and in direct contact with the plurality of first electrode blocks;
   the plurality of first electrode blocks are respectively in direct contact with the plurality of sensing portions; and
   the plurality of second electrode blocks are respectively in direct contact with the plurality of sensing portions.

12. The touch substrate of claim 11, wherein the plurality of first electrode blocks are respectively in direct contact with the plurality of sensing portions;
   the plurality of second electrode blocks are respectively in direct contact with the plurality of sensing portions; and
   a respective one of the plurality of first electrode blocks, the respective one of the plurality of sensing portions, and a respective one of the plurality of second electrode blocks form a touch unit configured to detect a change in electrical resistivity in the respective one of the plurality of sensing portions in response to the pressure from the touch.

13. The touch substrate of claim 11, wherein an orthographic projection of the respective one of the plurality of first electrode blocks on the base substrate at least partially overlaps with an orthographic projection of the respective one of the plurality of sensing portions on the base substrate; and
   an orthographic projection of the respective one of the plurality of second electrode blocks on the base substrate at least partially overlaps with the orthographic projection of the respective one of the plurality of sensing portions on the base substrate.

14. The touch substrate of claim 11, wherein a thickness of the non-sensing portion is greater than a thickness of each of the plurality of sensing portions.

15. The touch substrate of claim 12, wherein a combined thickness of the respective one of the plurality of first electrode blocks, the respective one of the plurality of sensing portions, and the respective one of the plurality of second electrode blocks in the touch unit is substantially the same as a thickness of the non-sensing portion.

16. The touch substrate of claim 11,
   wherein the non-sensing portion and the plurality of sensing portions together define a plurality of subpixel regions;
   the touch control display panel further comprises a plurality of color filter blocks respectively in the plurality of subpixel regions;
   a respective one of the plurality of non-sensing portions is in direct contact with at least one adjacent color filter block; and
   the respective one of the plurality of sensing portions, a respective one of the plurality of first electrode blocks, a respective one of the plurality of second electrode blocks are in direct contact with a same adjacent color filter block.

17. The touch substrate of claim 11, further comprising:
   a plurality of first signal lines respectively electrically connected to the plurality of first electrode blocks, and configured to apply a common voltage to the plurality of first electrode blocks; and
   a plurality of second signal lines respectively electrically connected to the plurality of second electrode blocks, and configured to transmit sensing signals from the plurality of second electrode blocks to an integrated circuit.

18. The touch substrate of claim 11, wherein the plurality of sensing portions are arranged in a form of array in the touch substrate.

19. A method of fabricating a touch control display panel, comprising:
providing a base substrate; and
forming a black matrix layer on a base substrate and in an inter-subpixel region of the touch control display panel;
wherein forming the black matrix layer comprises forming a non-sensing portion, and forming a plurality of sensing portions spaced apart from the non-sensing portion;
wherein the method further comprises:
forming a first electrode layer comprising a plurality of first electrode blocks respectively between the plurality of sensing portions and the base substrate; and
forming a second electrode layer comprising a plurality of second electrode blocks respectively on a side of the plurality of sensing portions away from the first electrode layer;
wherein a respective one of the plurality of sensing portions is formed to undergo a restorable change in electrical resistivity in response to a pressure from a touch;
the non-sensing portion and the plurality of sensing portions comprise a same conductive black material;
a same side of the base substrate is in direct contact with the non-sensing portion and in direct contact with the plurality of first electrode blocks;
the plurality of first electrode blocks are respectively in direct contact with the plurality of sensing portions; and
the plurality of second electrode blocks are respectively in direct contact with the plurality of sensing portions.

20. The method of claim 19, wherein the non-sensing portion and the plurality of sensing portions together define a plurality of subpixel regions;
the method further comprises forming a plurality of color filter blocks respectively in the plurality of subpixel regions;
a respective one of the plurality of non-sensing portions is in direct contact with at least one adjacent color filter block; and
the respective one of the plurality of sensing portions, a respective one of the plurality of first electrode blocks, a respective one of the plurality of second electrode blocks are in direct contact with a same adjacent color filter block.

* * * * *